(No Model.)

W. W. SPARHAWK.
COMBINATION TOOL.

No. 355,481.  Patented Jan. 4, 1887.

WITNESSES:
O. D. Mott
C. Sedgwick

INVENTOR:
W. W. Sparhawk
BY Munn & Co.
ATTORNEYS.

UNITED STATES PATENT OFFICE.

WILLIAM WALLACE SPARHAWK, OF SCOTIA, NEBRASKA.

COMBINATION-TOOL.

SPECIFICATION forming part of Letters Patent No. 355,481, dated January 4, 1887.

Application filed June 7, 1886. Serial No. 204,352. (No model.)

*To all whom it may concern:*

Be it known that I, WILLIAM WALLACE SPARHAWK, of Scotia, in the county of Greeley and State of Nebraska, have invented a new and Improved Combination-Tool, of which the following is a specification, reference being had to the annexed drawings, forming a part thereof, in which—

Figure 1:
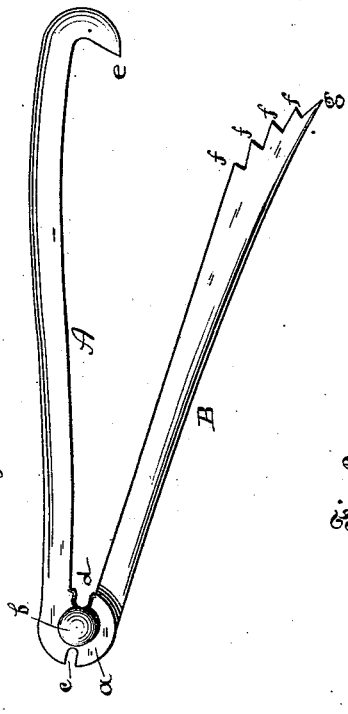
Figure 3:
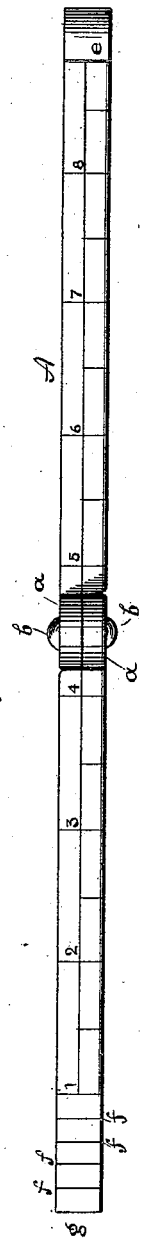
Figure 2:
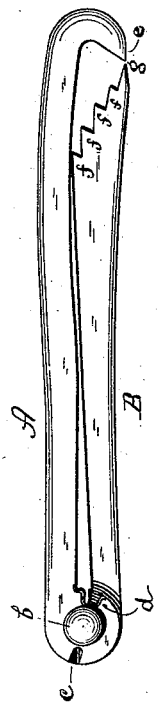

Figure 1 is a side elevation showing the tool partly open. Fig. 2 is a side elevation showing the tool closed. Fig. 3 is an edge view of the tool widely open, showing the graduations on the inner surfaces of the two parts of the tool.

Similar letters of reference indicate corresponding parts in the different figures of the drawings.

The object of my invention is to provide a simple and efficient combination-tool to be used as a hand-wrench, pipe wrench, wire-cutter, wire-nipper, screw-driver, tack-drawer, measuring-rule, and for other purposes.

My invention consists in two arms pivoted together, one arm being provided with a chisel-edged pointed hook at the free end thereof, the other arm having on its inner surface, near the end series of teeth and at the extremity, a screw-driver edge, the two arms being graduated on their adjoining faces to form a measuring-rule.

It also consists in notches formed in the circular ends of the arms on opposite sides of the pivot for nipping and cutting wire.

The arms A B are each provided with flat circular ends $a$, projecting entirely from the adjoining faces of the arms. The arms are pivotally connected by a rivet, $b$, passing centrally through the circular ends $a$. The circular ends $a$, on opposite sides of the rivet $b$, are provided with notches $c\ d$, the notches of the two circular ends being capable of coinciding when the arms A B are partly open, as shown in Fig. 1. At the sides of the notches $c$ are formed wire-cutting edges, and the corners of the metal at the side of the notches $d$ are rounded, to enable the arms to grasp wire for the purpose of stretching it without danger of severing it. The arm A is slightly curved near its free end toward the arm B, and its extremity is provided with a chisel-edged angled hook, $e$, which is inclined inward toward the pivot of the arm. The arm B is thickened near its free extremity, curved outward, and provided with sharp-edged teeth $f$, inclined outwardly, and upon the extreme free end of the arm B is formed a screw-driver edge, $g$. The inner or adjacent faces of the arms A B are graduated into inches and fractions of inches, so that the device may be employed as a measuring-rule.

The notches $c\ d$ may be employed for cutting and holding wire, as already described.

The hook $e$ is designed to be used for drawing nails and tacks and for engaging one side of a piece of pipe or a nut while being turned, the opposite side of the nut or pipe being engaged by one or more of the teeth $f$ on the end of the arm B. The screw-driver edge $g$ is applied to a screw in the usual way, and the arm A is employed as a lever for turning the screw. The arms A B fold compactly together, the screw-driver edge $g$ coming directly opposite the edge of the hook $e$, and the outer corners of the arms A B are rounded to permit of using the tool without injury to the hands, also to prevent the wear of the pocket in which the tool is carried.

Having thus described my invention, what I claim as new, and desire to secure by Letters Patent, is—

1. A combination-tool formed of two arms, A B, provided with pivoted circular ends $a$, having opposite notches $c\ d$, forming wire-cutters, the arm A being provided with a chisel-edged hook, $e$, and the arm B having teeth $f$, substantially as set forth.

2. A combination-tool formed of the arms A B, provided with circular ends $a$, connected together by the rivet $b$, and having in opposite edges notches $c\ d$, the arm A being provided with a chisel-edged hook, $e$, and the arm B having series of sharp-edged teeth, $f$, and a screw-driver edge, $g$, substantially as shown and described.

3. As an improved article of manufacture, a combination-tool formed of two arms, A B, provided with circular ends $a$, having notches $c\ d$, and the pivotal rivet $b$, connecting the circular ends, the arm A having formed on the free end thereof a chisel-edged hook, $e$, and the arm B having on the free end thereof the sharp-edged teeth $f$ and the screw-driver edge $g$, both arms A B being graduated, substantially as shown and described.

WILLIAM WALLACE SPARHAWK.

Witnesses:
T. D. CANNEE,
W. B. WEEKES.